(12) United States Patent
Boffi et al.

(10) Patent No.: US 6,483,629 B1
(45) Date of Patent: Nov. 19, 2002

(54) OPTICAL WINDOW SIGNAL GENERATOR

(75) Inventors: Pierpaolo Boffi, Voghera (IT); Lucia Marazzi, Pavia (IT); Mario Martinelli, Milan (IT); Paola Parolari, Milan (IT)

(73) Assignee: Corning O.T.I., Inc., Dover, DE (US)

( * ) Notice: Subject to any disclaimer, the term of this patent is extended or adjusted under 35 U.S.C. 154(b) by 0 days.

(21) Appl. No.: 09/217,841

(22) Filed: Dec. 22, 1998

Related U.S. Application Data
(60) Provisional application No. 60/071,721, filed on Jan. 16, 1998.

(30) Foreign Application Priority Data

Dec. 23, 1997 (EP) .............................................. 97122771

(51) Int. Cl.[7] .............................. H01S 3/30; G02B 5/14
(52) U.S. Cl. .................... 359/336; 359/340; 359/341.1; 359/346
(58) Field of Search ................... 359/336, 340, 359/341, 341.1, 341.41, 346; 372/21, 25

(56) References Cited

U.S. PATENT DOCUMENTS

| | | | |
|---|---|---|---|
| 4,136,929 A | | 1/1979 | Suzaki |
| 4,738,503 A | | 4/1988 | Desurvire et al. |
| 4,958,354 A | * | 9/1990 | Urakami et al. ............... 372/29 |
| 5,007,061 A | | 4/1991 | Odagawa |
| 5,050,183 A | * | 9/1991 | Duling ........................ 372/25 |
| 5,088,095 A | | 2/1992 | Zirngibl |
| 5,168,400 A | | 12/1992 | Moses |
| 5,233,619 A | | 8/1993 | Furuhashi et al. |
| 5,359,612 A | * | 10/1994 | Dennis et al. ................. 372/21 |
| 5,495,362 A | * | 2/1996 | Takatu et al. ................ 359/341 |
| 5,500,762 A | | 3/1996 | Uchiyama et al. |
| 5,533,154 A | | 7/1996 | Smith |
| 5,537,243 A | | 7/1996 | Fatehi et al. |
| 5,566,261 A | * | 10/1996 | Hall et al. .................... 372/21 |
| 5,581,389 A | | 12/1996 | Lee et al. |
| 5,699,371 A | * | 12/1997 | Handa et al. ................... 372/6 |

FOREIGN PATENT DOCUMENTS

EP      0 197 848 A1    10/1986

OTHER PUBLICATIONS

K. Shimizu et al., "Technique for Translating Light–Wave Frequency by Using an Optical Ring Circuit Containing a Frequency Shifter", Optics Letters, 17 (18) 1307–1309 (1992).

K. Shimizu et al., "Frequency Translation of Light Waves by Propagation Around an Optical Ring Circuit Containing a Frequency Shifter: II. Theoretical Analysis," Applied Optics, 33 (15): 3209–3219 (1994).

K. Shimizu et al., "Frequency Translation of Light Waves by Propagation Around an Optical Ring Circuit Containing a Frequency Shifter: I. Experiment", Applied Optics, 32 (33): 6718–6726 (1993).

Applied Optics, 32 (33) : 6718–6726 (1993).

P. Boffi et al., "Photonic Sampler for 1550–nm Signals" Optical Society of America, (1995).

C. Giles et al., "Propagation of Signal and Noise in Concatenated Erbium–Doped Fiber Optical Amplifiers", J. Lightwave Tech., 9 (2) : 147–154 (1991).

E. Desurvire, "Erbium–Doped Fiber Amplifiers—Principles and Applications" John Wiley & Sons, N.Y., N.Y., p. 19, (1994).

* cited by examiner

*Primary Examiner*—Nelson Moskowitz
(74) *Attorney, Agent, or Firm*—Needle & Rosenberg, P.C.

(57) ABSTRACT

An optical window signal generator which begins generation of an optical output signal in response to an optical activation pulse, and terminates generation of the optical output signal in response to an optical deactivation pulse. The rise time of the optical output signal is equal to the rise time of the optical activation pulse, and its fall time is equal to the rise time of the optical deactivation pulse.

24 Claims, 4 Drawing Sheets

OPTICAL WINDOW SIGNAL GENERATOR

This application is based on European Patent Application No. 97122771.5 filed on Dec. 23, 1997 and U.S. Provisional Application No. 60/071,721 filed on Jan. 16, 1998, the content of which is incorporated hereinto by reference.

BACKGROUND OF THE INVENTION

The present invention relates to optical communication systems. More particularly, the present invention relates to an optical window signal generator device which produces an optical output signal in response to an activation and a deactivation optical pulse.

In many optical systems, it is useful to generate window pulses in response to controlling light pulses. These pulses can serve for example to activate the optical windows used for the sampling, interruption, and starting functions of digital optical signals. A window pulse, also referred to as an optical output signal, begins when the apparatus producing the window pulse receives an activation pulse. The window pulse terminates when the apparatus producing the pulse receives a deactivation pulse.

A window signal is essentially a step pulse of extended duration. It has three principal characteristics: the duration of the window, the rise time, and the fall time of the step generated. The rise time indicates how rapidly the window signal reaches its proper amplitude after the activation pulse is received, and the fall time indicates how rapidly the window pulse terminates after a deactivation pulse is received. For applications to optical communications systems and switching systems, it is important that the duration and rise time of the step signal generated be compatible with the bit rate of the transmission that is being sampled. In particular, if it is desired to sample a digital signal without interrupting a bit, the rise time must be 1 or preferably 2 orders of magnitude faster than the duration of the bit itself. The required duration of the window pulse depends on the length of the signal that must be sampled. For example, if it is desired to sample an entire cell of a packaged transmission, the duration of the window can be hundreds of times the duration of a single bit. Devices performing this sampling are useful in many digital subsystems, and are used in converters, counters and optical digital computers. It is very important in view of -these applications to control the rise time and duration of the window signal accurately.

Current optical switching systems cannot effectively meet these requirements and are unable to produce an optical window signal having a rise time, duration and fall time appropriate for the purposes listed above.

Another problem of the current methods is that there are no simple ways for controlling the generation of optical window signals, which must be activated and deactivated by simple pulses of light.

U.S. Pat. No. 5,537,243 to Fatehi et al. describes an all optical flip-flop achieved by employing two optical amplifiers arranged so that they together operate in only one of two stable states at a given time. In a first stable state of operation, the first optical amplifier behaves as a laser having a first characteristic wavelength. When an optical signal pulse is received at the input of the first optical amplifier the arrangement is switched to a second stable state of polarization in which the second optical amplifier behaves as a laser having a second characteristic wavelength, where the first and second characteristic wavelengths are at least nominally different. The arrangement is switched back to the first stable state when an optical signal pulse is received at the input of the second optical amplifier.

U.S. Pat. No. 5,007,061 to Odagawa discloses a bi-stable semiconductor laser diode device which has means for irradiating a reset light which stops the delivery of a lasing light from the laser. The laser includes an active layer comprising a gain region in which a stimulated emission occurs to obtain an optical gain, and a saturable absorption region in which no stimulated emission occurs so as not to obtain an optical gain at the lasing wavelength. The laser is reset by irradiating the gain region of the laser with a light having such a wavelength that it is amplified by stimulated emission.

Shimizu et al. in *Optics Letters*, Vol. 17, No. 18, Sep. 15, 1992, p. 1307–09, discuss a technique for the external frequency translation of light waves, which enables the stepwise sweeping of an optical frequency in time over a wide range. The frequency translator described is composed of an optical pulse modulator and an optical ring circuit containing an acousto-optic frequency shifter and an optical amplifier. The pulse launched into the ring circuit undergoes a frequency shift for each complete trip around the ring circuit, and the frequency is translated considerably from the original input pulse.

Shimizu et al. in *Applied Optics*, Vol. 32, No. 33, Nov. 20, 1993, p. 6718–26 and in *Applied Optics*, Vol. 33, No. 15, May 20, 1994, p. 3209–19 report a technique for the external frequency translation of light waves, permitting stepwise sweeping of an optical frequency over a wide range with high linearity with respect to time. The papers report experimental and theoretical analysis of the device.

U.S. Pat. No. 5,500,762 to Uchiyama et al. describes a light frequency control apparatus comprising a light pulse signal generating mechanism; a light signal generating mechanism for generating a light signal with a staircase-shaped frequency shift based on the number of cycles of a loop within which the light pulse signal propagates; and a mechanism for generating a dummy light when the signal light level becomes zero and for supplying the dummy light to a light amplifying mechanism. The purpose of this device is to increase the number of loop cycles of a light pulse signal within the light frequency shifter by improving the stability of and by shaping the output signal, and also to conduct a frequency shift over a wide range, as well as conversion of a stable light frequency.

U.S. Pa. No. 5,581,389 to Lee et al. describes a light frequency control apparatus comprising a light pulse signal generating mechanism; a light frequency shifter for circulating this light pulse signal a predetermined number of times, delaying the light pulse signal at each cycle thereby sequentially shifting and outputting the light pulse signal; an extracting mechanism for extracting the light pulse in the second half of a cycle, and a polarization control mechanism in the light frequency shifter for controlling the polarization of the circulating pulse based on the amount of attenuation of the light pulse signal outputted by the extracting mechanism. This device is intended to provide a light frequency control apparatus which can increase the number of cycles of a light signal by reducing the polarization dependency of the light frequency shifter to produce a stable light signal.

U.S. Pat. No. 4,738,503 to Desurvire et al. describes a fiber optic recirculating memory comprising a splice free length of optical fiber which forms a loop that is optically closed by means of a fiber optic coupler. The coupler couples an optical signal input pulse to the loop for circulation therein, and outputs a portion of the signal pulse on each circulation to provide a series of output pulses. A pump source is included to cause stimulated Raman scattering in the fiber loop and thereby cause amplification of the circulating signal pulse.

U.S. Pat. No. 5,533,154 to Smith describes an optical memory for storing optical signals of a first wavelength. FIG. 1 in Smith shows a known optical memory configuration. Its basic elements consist of a long loop (25 km in the example) of single mode fiber, a 3 dB fiber coupler and a single erbium-doped fiber amplifier (EDFA). The signal pulses to be stored are gated, via a first gate, into the loop via a port of the 3 dB coupler. A pulse train with a total duration of 120 ms just fills the 25 km long loop. As long as unity loop gain is maintained, the signal continues to circulate without decrease in pulse energy. A port of the 3 dB coupler acts as a tap for the memory, and a second gate selects the stored data after the desired time interval. FIG. 2(a) in Smith shows the decay of the output of the loop from the initial injection of the pulse train over 30 ms of delay to when the pump power to the loop EDFA is switched off. The limited resolution of the digital storage oscilloscope used does not reveal the individual 120 ms pulse trains. Applicants remark that by switching off the pump power of the EDFA in the loop a relatively slow decay of the pulse train power in the loop is achieved, due to the relatively slow decay time of the excited levels of Erbium in the EDFA.

Applicants have discovered that none of the conventional methods are capable of generating a satisfactory optical window signal, and in particular an optical window signal having the duration and rise time characteristics required to sample a digital optical signal, or for other applications requiring precise control of the duration, the rise time, and the fall time of the optical window signal generated.

SUMMARY OF THE INVENTION

Accordingly, the present invention is directed to an optical window signal generator device that substantially obviates one or more of the problems due to the limitations and disadvantages of the related art.

Additional features and advantages of the invention will be set forth in the description that follows, and in part will be apparent from the description, or may be learned by practice of the invention. The objectives and other advantages of the invention will be realized and obtained by the process and by the apparatus particularly pointed out in the written description and claims hereof as well as the appended drawings.

To achieve these and other advantages and in accordance with the purpose of the invention, as embodied and broadly described, the invention is an optical window signal generator including a first beam splitter having first and second inputs and one output, a second beam splitter having an input optically coupled to the output of the first beam splitter and having a first output and a second output optically coupled to the second input of the first splitter to provide an optical feedback loop, and an optical amplifier included in the feedback loop. In the optical window signal generator, an activation optical pulse communicated to the first input of the first beam splitter is split into a leading portion of an output optical signal and into an optical feedback signal, respectively, at the first and second outputs of the second beam splitter. The feedback optical signal is amplified by the optical amplifier to sustain the output optical signal beyond the termination of the activation optical pulse. An optical element is also included in the feedback loop for suppressing the feedback optical signal in response to receipt of a deactivation optical pulse, thereby terminating the optical output signal.

In another aspect, the invention includes a method for generating an optical window signal, started by an optical activation pulse and terminated by an optical deactivation pulse, having the steps of communicating the optical activation pulse to, an optical feedback loop, splitting the optical activation pulse into a leading portion of an output optical signal and into a feedback optical signal, amplifying the feedback optical signal to sustain the output optical signal beyond the termination of the optical activation pulse, and to maintain self-sustaining amplification. The method also has steps for communicating the optical deactivation pulse to the optical feedback loop, and terminating the self-sustaining amplification in response to the optical deactivation pulse, thus terminating the sustained output optical signal.

In another aspect, the invention includes an optical window signal generator having an optical coupler for inserting an optical activation pulse in a feedback loop and for extracting an optical output signal from the feedback loop, and an optical amplifier and an optical element included in the feedback loop. The optical activation pulse is split by the coupler into a leading portion and a feedback optical signal, which is amplified by the optical amplifier and transmitted to the optical coupler to sustain the optical activation pulse. The optical element suppresses the feedback signal in response to receipt of an optical deactivation pulse, so that the sustained optical output signal is terminated.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide further understanding of the invention and are incorporated in and constitute a part of the specification, illustrate several embodiments of the invention and together with the description serve to explain the principles of the invention.

DETAILED DESCRIPTION OF THE PREFERRED EMBODIMENTS

Reference will now be made in detail to the present preferred embodiments of the invention, examples of which are illustrated in the accompanying drawings. Whenever possible, the same reference numbers will be used throughout the drawings to refer to the same or like parts.

Figure 1:
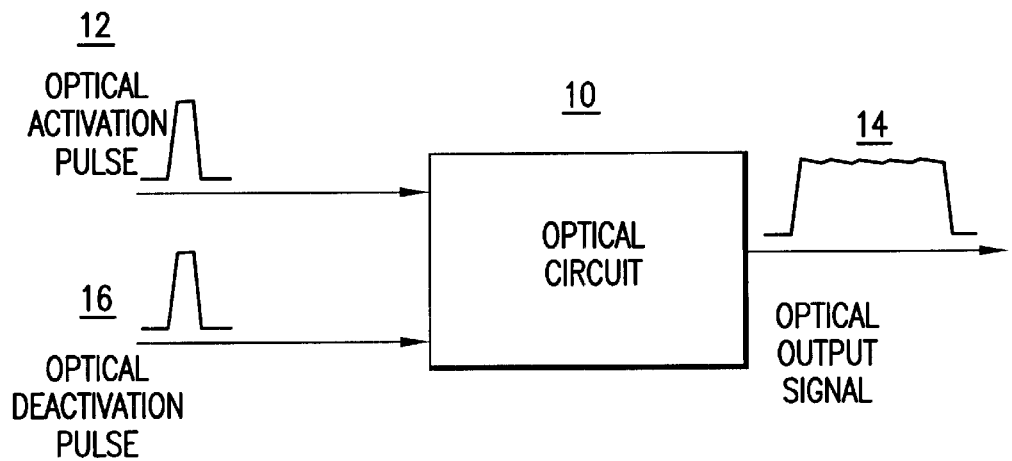
FIG. 1 shows a schematic drawing of an optical window signal generator device for producing a window output signal.
Figure 2:
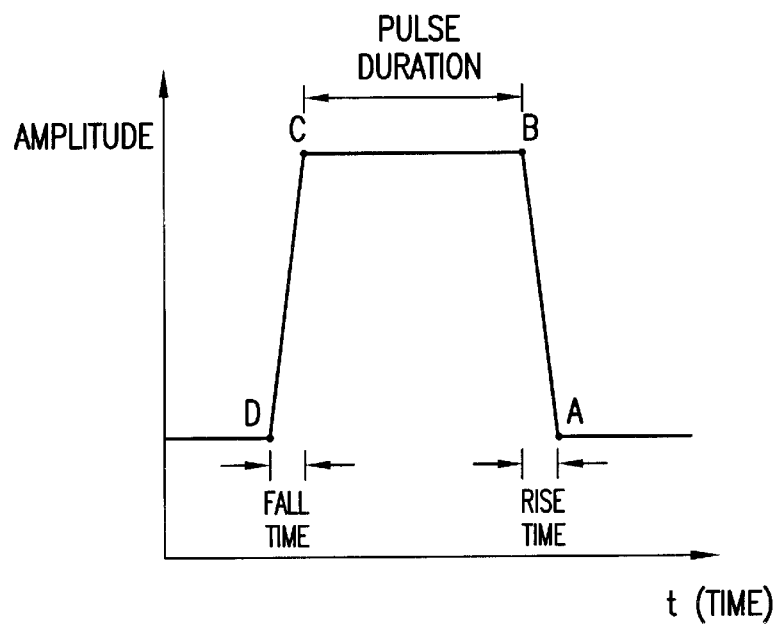
FIG. 2 is a graph showing the amplitude of a light pulse as a function of time.

The present invention is an optical window signal generator. Referring to FIG. 1, one embodiment of the invention is shown schematically, where the optical circuit 10 receives an optical activation pulse 12 which causes it to start generating an optical output signal 14. Upon receiving an optical deactivation pulse 16 the optical circuit 10 terminates generation of the optical output signal 14. The optical pulses have a given amplitude over time represented by the graph of FIG. 2 where the amplitude of the pulse is plotted against time. The pulse here is an optical square pulse, however other pulse shapes can be utilized, for example, a half-cycle of a sinusoidal wave, or a Gaussian curve shaped signal. For a square pulse, the rise time of the pulse is indicated by the distance on the time axis between point A and point B in FIG. 2, and indicates how quickly the pulse reaches its amplitude. The pulse duration is indicated by the distance between points B and C on the time axis, and the fall time of the pulse is indicated by the distance on the time axis between point C and point D. A pulse of this type can be used as an optical activation pulse as well as an optical deactivation pulse.

Figure 3:
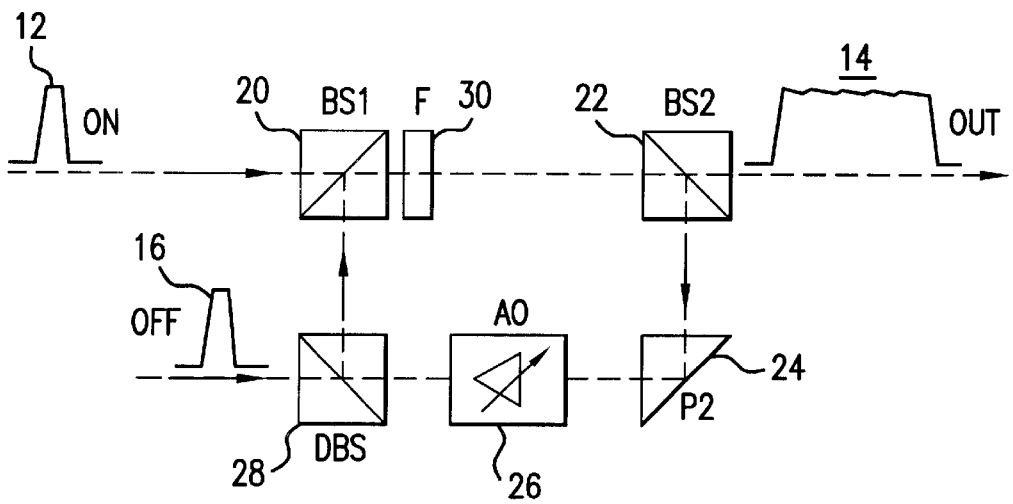
FIG. 3 shows a schematic representation of one embodiment of the present invention including an optical amplifier and a beam splitter for introducing a deactivation optical signal.

An exemplary embodiment of the window signal generator device of the present device is shown in FIG. 3 and is designated generally by the reference numeral 10. An optical window signal generator consistent with the present invention comprises a first beam splitter having first and second inputs and an output, a second beam splitter having an input optically coupled to the output of the first beam splitter, a first output, and a second output optically coupled to the second input of the first beam splitter to provide an optical feedback loop, and an optical amplifier included in the feedback loop. An optical element is also included in the feedback loop for suppressing the feedback optical signal in response to a deactivation optical pulse.

In accordance with one embodiment of the invention, the optical element for suppressing the feedback optical signal is a third beam splitter, having a first input and a first output for transmitting the feedback optical signal, and having a second input, and a second output optically coupled to the optical amplifier.

The embodiment of the invention shown in FIG. 3 is a circuit using light propagation in free space, where light beams travel in the atmosphere or in vacuum between optical elements such as prisms, mirrors and filters. Alternatively, the same optical circuit can be obtained using guided propagation components, such as waveguides, optical fibers, and fiber amplifiers to guide the light between optical components. A third approach comprises making the optical circuit as an integrated circuit on a planar substrate, e.g. $SiO_2$ or $LiNbO_3$, by known planar optics techniques. The optical couplings between the optical elements of the feedback loop within the optical window signal generator can be made by standard optical fibers or planar waveguides in a guided propagation apparatus, but a free propagation apparatus is preferable in certain applications.

As embodied herein and referring to FIG. 3, the optical window signal generator has an optical path that includes a first beam splitter 20, an optical filter 30, and a second beam splitter 22. If optical components are used in a free propagation apparatus, the beam splitter can be a partially reflective mirror or a prism. Alternatively, the beam splitter can be made as an integrated waveguide device, a fused fiber device, an interferential coupler, or another device compatible with the specific application. The output of first beam splitter 20 is optically coupled to the input of second beam splitter 22. The window signal generator also includes an optical amplifier 26 which is optically coupled to one output of the second beam splitter 22 by a reflective element 24 such as a prism, a mirror or the like, and is also optically coupled to one input of the first beam splitter 20 by a third beam splitter 28. If the feedback loop is made of optical fibers or waveguides, no reflective elements are needed, since the light simply follows the optical fibers along the path leading to the optical amplifier.

When an optical activation pulse 12 is communicated to the first beam splitter 20, it enters a feedback loop of the optical amplifier formed by the first beam splitter 20, the second beam splitter 22, the optical amplifier 26 and the third beam splitter 28. The activation optical pulse 12 is divided by the second beam splitter 22 into a leading portion of an output signal 14 which exits the feedback loop, and into a feedback optical signal which is transmitted to the optical amplifier 26. The feedback optical signal is amplified by the optical amplifier 26 and is then transmitted back to the second beam splitter 22, being reflected on the way by the third beam splitter 28 and the first beam splitter 20. Second beam splitter 22 then divides the feedback optical signal into a first portion which is transmitted to sustain the output optical signal 14 beyond the termination of the initial optical activation pulse, and a second portion which is transmitted again to the optical amplifier 26 to maintain a self-sustaining amplification within the feedback loop. The output optical signal 14 continues to be sustained as long as self sustaining amplification takes place in the feedback loop.

In a preferred embodiment, the gain of the optical amplifier 26 is sufficient to compensate for losses incurred by the feedback optical signal while traveling in the feedback loop and to make up for the portion of the feedback optical signal divided to sustain the output signal. The optical amplifier 26 may be any type of optical amplifier, and preferably can be a semiconductor optical amplifier or a waveguide doped with rare earth dopants, such as an erbium-doped fiber amplifier (EDFA). Alternative or additional rare-earth dopants may be used in fiber amplifier 26 without deviating from the intent and scope of the present invention. When a free propagation laser apparatus is used, the optical amplifier can be simply a slab of glass or crystal doped with a laser active dopant such as rare earth elements in a conventional manner. As will be evident to one of ordinary skill in the art, the amplifier's gain, saturation power, wavelength of operation, decay time of the excited states and amplified spontaneous emission (ASE) may affect which type of amplifier to use in a specific application.

The optical feedback loop that includes optical amplifier 26, first beam splitter 20, second beam splitter 22, and an optical device for interrupting the signal traveling in the feedback loop, here embodied by a third beam splitter 28, preferably has a feedback time, or recirculation time through the feedback loop, which is equal to the pulse duration of the optical activation pulse 12. This duration is indicated by distance B–C in FIG. 2. With this configuration, each successive feedback optical signal amplified by optical amplifier 26 will reach the beam splitter 22 at the end of the preceding feedback optical signal, where a portion of the feedback optical signal will sustain the optical output signal. A sustained optical output signal of constant amplitude will thus be outputted by the window signal generator device. If the feedback time is longer than the duration of the activation pulse, the output signal will be a series of pulses, each having the duration of the activation pulse, with a repeating period equal to the feedback time. The skilled in the art can avoid the latter condition by operatively selecting either the optical activation pulse duration or the optical length of the feedback loop, or both, so that the feedback time is equal to the activation pulse duration. A required optical length for the feedback loop can be achieved, for example, by correspondingly selecting the relative position of the beam splitters 20, 22, 28 and/or of reflector 24 or by arranging an appropriate delay line within the feedback loop (e.g., between splitter 22 and amplifier 26).

To avoid the occurrence of lasing within the feedback loop, the recirculation time of the feedback loop should be significantly greater that the coherence time of the input signal, or activation pulse. The coherence time is a function of the spectral linewidth Dl of the activation pulse.

In the preferred embodiment of the window signal generator device, the duration of the sustained output optical signal is affected by the sum of the contributions of noise generated by the optical amplifier. This noise can be across the entire emission spectrum of the optical amplifier in cases where ASE noise occurs in the feedback loop. To reduce the amount of noise from amplifier 26 that accumulates in the feedback loop, an optical filter 30 is disposed within the feedback loop. This filter can be an interference filter, an etalon filter, a Mach-Zehnder filter, an interference grating, a diffraction grating, or any other suitable device. This arrangement with optical filter 30 with the feedback loop allows for longer duration of the sustained output optical signal, which is useful for example, when sampling optical digital data of long duration.

In an embodiment, the wavelengths of the activation pulse and of the deactivation pulse are different from each other. In this embodiment filter 30 can be advantageously selected so as to pass the wavelength of the activation pulse and to stop the wavelength of the deactivation pulse, so as to avoid transmission of the deactivation pulse to the device output.

If the gain of the optical amplifier 26 is appropriately controlled to compensate for the losses of the feedback path and if the filtering of the noise components of optical amplifier 26 is carried out by filter 30, a constant output optical signal of long duration can be produced. At each iteration, a portion of the feedback optical signal will be added to the preceding output pulse. If the feedback time of the feedback loop is equal to the duration of the optical activation pulse, an output optical signal having a duration that is a multiple of the duration of the original activation pulse will be generated. By recirculating the pulse in the feedback loop a predetermined number of times, the output optical signal will be sustained for a predetermined amount of time. Naturally, the rise time of the output optical signal will be equal to the rise time of the activation optical pulse, since the leading portion of the output optical signal was formed by a pulse divided from the original activation pulse.

The termination of the sustained output optical signal, according to the embodiment illustrated in FIG. 3, is obtained by communicating an optical deactivation pulse 16 to the third beam splitter 28. The optical deactivation pulse is transmitted to the optical amplifier 26, which is saturated by the deactivation pulse 16, thus inhibiting the gain of the feedback loop. The recirculating signal is then interrupted. The saturation phenomenon can occur very rapidly, so that the fall time of the terminated sustained output optical signal can be equal to the rise time of the deactivation pulse. The speed of saturation depends on the pump power of the optical amplifier and on the power of the deactivation pulse. The greater the pump power and the deactivation pulse power, the faster the saturation occurs.

In the case of a square saturating pulse, the time constant $t_{sat}$ of the saturation phenomenon is given by $$t_{sat}=t/(1+p+q)$$

where t is the decay time for the excited laser level in the amplifier; q is the pump power of the optical amplifier normalized with respect to the amplifier saturation power $P_{sat}(l_p)$ at the pump wavelength $l_p$; and p is the power of the deactivation pulse normalized with respect to the amplifier saturation power $P_{sat}(l^d)$ at the wavelength $l_d$ of the deactivation pulse; and where the saturation power of the amplifier at a wavelength l is defined as $$P_{sat}(l)=hlA/[S_a(l)+S_e(l)]t,$$

where is Planck's constant, A is the effective beam area, $s_a(l)$ is the absorption cross section, $S_e(l)$ is the emission cross section. In the case of an active fiber amplifier the effective beam area A is given by $pw^2$, where w is the mode radius (see, e.g., Desurvire, "Erbium-doped fiber amplifiers. Principles and applications", John Wiley & Sons, 1994, p; 19).

The recovery time $t_{rec}$ is the time constant which determines the recovery of the initial condition for the optical amplifier after the deactivation pulse ends and it becomes smaller as the pumping power for the optical amplifier increases. At the end of a square saturating pulse the recovery time is given by $$t_{rec}=t/(1+q).$$

A preferred amplifier for this embodiment is the semiconductor amplifier, since its decay time for the excited level t is faster than in a fiber amplifier, resulting in a faster fall time, or termination of the output signal. This allows more data per second to be sampled. For a typical EDFA amplifier, the decay time is in the order of microseconds, while for a semiconductor laser it is in the order of nanoseconds.

It is possible to choose the wavelength of the optical deactivation pulse so that the optical filter in the feedback loop will remove the spectral components of the feedback signal due to the deactivation pulse. In that way, the output of the optical circuit will not contain components due to the deactivation pulse, but will mirror only the optical activation pulse.

A second embodiment of the invention will now be described, where like or similar parts are identified throughout the drawings by the same reference characters. An optical window signal generator consistent with the present invention also comprises an optical element for suppressing the feedback optical signal that is an optical interrupter with optical command, whereby the optical deactivation pulse communicated to the optical element causes the optical element to interrupt the optical signal within the feedback loop, thus terminating the sustained output optical signal.

Figure 4:
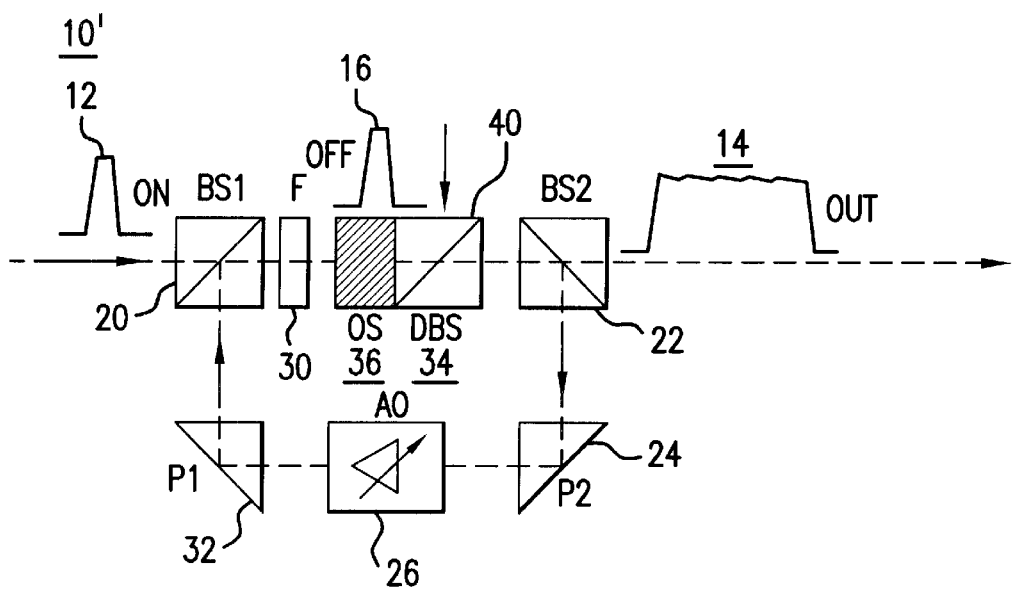
FIG. 4 shows a schematic representation of a second embodiment of the present invention including an optical amplifier and an optical interrupter device.

As embodied herein and referring to FIG. 4, the optical window signal generator comprises first beam splitter 20, second beam splitter 22, optical amplifier 26 and filter 30. FIG. 4 shows a circuit with light following a propagation path through free space. The optical window signal generator also comprises an optical element to interrupt the feedback optical signal in the feedback loop. This optical element 40, as embodied herein, includes an interrupter beam splitter 34 and an optical switch 36. In this embodiment, a portion of optical activation pulse 12 forms the leading part of an optical output signal 14 and begins the self-sustaining amplification through the feedback loop, in a similar manner as in the first embodiment described above. The optical interrupter 40 is placed within the optical feedback loop, and can be located anywhere within the feedback loop, however, the position of the interrupter in the optical circuit can be optimized to avoid delays in interrupting the feedback signal. When an optical deactivation pulse 16 is communicated to the interrupter beam splitter 34, it is transmitted to optical switch 36, which blocks the optical feedback signal in the feedback loop, and ends the self sustaining amplification. For example, the polarization transmitted by the interrupter can be changed by the optical deactivation pulse, so that the polarized optical feedback signal is absorbed by the interrupter. This terminates the optical output signal 14. The optical switch 36 can be made of a material such as CdTe:In, which is able to instantaneously change from transparent to opaque to a polarized signal under the action of an optical pulse, similarly to a Pockel cell. The interrupter could also be made, for example, with an electro-optical switch or an acousto-optical switch, as long as the interrupter's presence does not affect the feedback loop when a deactivation pulse has not yet been received. The interruption time for these devices can be very fast, on the order of a nanosecond or less, and the recovery time until a next output signal can be generated in the feedback loop is on the order of several microseconds, depending on the type of material used in the optical switch 36, on the amplifier used, and on the type of deactivation pulse 16.

In a manner consistent with the invention, the optical window signal generator can be made with bulk optical elements in a free path propagation design, but the same results can be obtained by using waveguide optical components like optical fibers, depending on the application. If a short duration optical window signal is desired (e.g., in the order of nanoseconds, or less, to microseconds), free propagation devices have given good results. Guided optical path devices give better results when optical windows of relatively long duration are desired (e.g., in the order of microseconds or longer). The generation of the output optical signal, or optical window, is controlled by the time characteristics of the activation and deactivation pulses, and is therefore suitable for generating optical window pulses with rise and fall times in the range of a picosecond or less. The duration of the entire window will be limited by the processes combining the accumulation of the ASE noise in the optical amplifier. The recovery time of the interruption process is limited by the actual repopulation times of the excited levels of the optical amplifier used, as explained above. These times can be typically on the order of 0.1 nanoseconds for a semiconductor optical amplifier, and of a few microseconds for an optical amplifier of the EDFA type.

In a manner consistent with a further embodiment of the invention, a method for generating an optical window signal started by an optical activation pulse and terminated by an optical deactivation pulse includes the steps of communicating the optical activation pulse to an optical feedback loop, splitting the optical activation pulse into a leading portion of an output optical signal and into a feedback optical signal, amplifying the feedback optical signal to sustain the output optical signal beyond termination of the optical activation pulse and to maintain self-sustaining amplification, communicating the optical deactivation pulse to the optical feedback loop, and terminating self-sustaining amplification in response to the optical deactivation pulse, thus terminating the sustained output optical signal. The self-sustaining amplification may be terminated by saturating the optical amplifier with the optical deactivation pulse. In yet a further embodiment, the self-sustaining amplification can be terminating by suppressing the feedback optical signal with an optical interrupter activated by the optical deactivation pulse.

As embodied herein and referring to FIGS. 1 and 3, an optical activation pulse 12 enters the feedback loop formed by a first beam splitter 20, second beam splitter 22 and an optical amplifier 26. The optical activation pulse is split by beam splitter 22 into a leading portion of an output optical signal 14, and into a feedback optical signal that is transmitted to the optical amplifier 26. The amplified optical feedback signal is then transmitted back to second beam splitter 22, where it is split into one portion which sustains the output optical signal beyond termination of the optical activation pulse, and into another portion that maintains the self-sustaining amplification within the feedback loop. A deactivation pulse 16 is communicated to the feedback loop where it terminates self-sustaining amplification, terminating the sustained optical output signal 14. As embodied in FIG. 3, the optical deactivation pulse is communicated to the third beam splitter 28, and is transmitted to the optical amplifier 26 to saturate it and thereby terminate the optical output signal 14.

As further embodied in FIG. 4, the optical deactivation pulse 16 is communicated to a beam splitter 34, and is transmitted to an optical switch 36 which, in response to the optical deactivation pulse 16, interrupts the optical signal in the feedback loop thereby terminating self-sustaining amplification and terminating the output signal 14.

According to the invention, the optical window generator can be constructed for application to a fiber optic circuit, or to an integrated optical circuit. An optical coupler is used to insert the optical activation signal in the feedback loop, and is also used to extract the output optical signal from the feedback loop. An optical amplifier and an optical element for suppressing the feedback optical signal are also included in the feedback loop.

Figure 5:
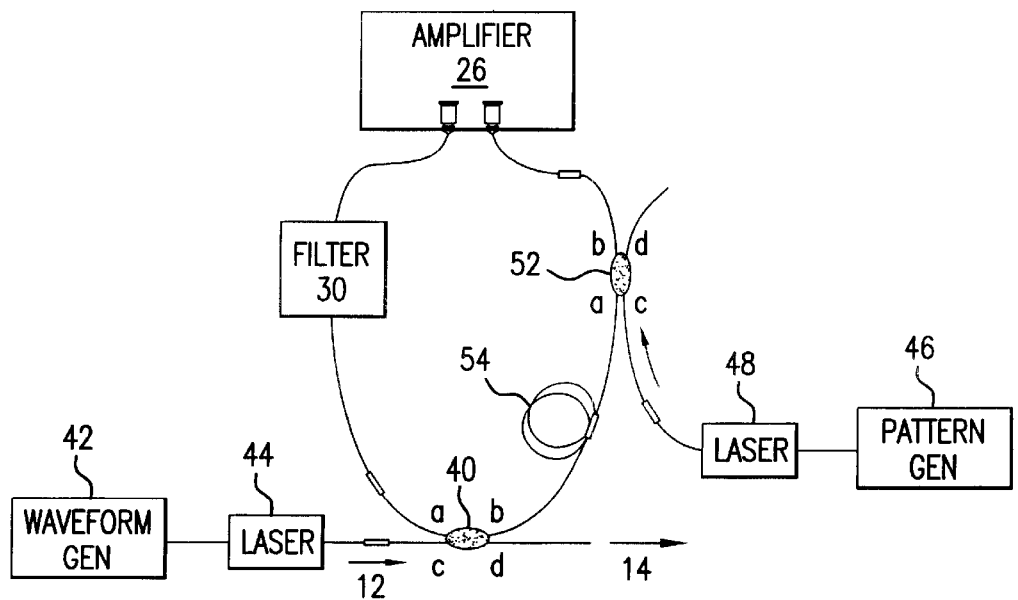
FIG. 5 shows a schematic representation of an embodiment of the present invention realized with a guided path for the light rays.

Referring to FIG. 5, a further preferred embodiment of an optical window generator made of optic fibers is described schematically. However, an integrated optical circuit construction would have a similar schematic. A waveform generator 42 and a laser source 44 are used to generate the optical activation pulse 12, although other methods to generate the optical activation pulse may be used, such as modulation of a laser source by an external optical modulator. In a test setup, the pulse was generated by an AT&T laser diode with wavelength 1540 nm, and mean output power 800 mW. The modulation was done with a Tektronix arbitrary waveform generator triggered by an external signal. The optical activation pulse 12 is transmitted by optic fibers to the coupler 40, which splits the optical activation pulse into a feedback optical signal transmitted to optical fiber 54 in the feedback loop, and a leading portion of the optical output signal 14. The coupler can be, for example, a fused fiber coupler of grade A, manufactured by MP Inc., and in a preferred embodiment can have a 50/50 coupling ratio, although other coupling ratios are possible. With this coupling ratio, the optical activation pulse enters coupler 40 at port 40c, and approximately half of the pulse exits from port 40d as output signal 14, while the other half enters the feedback loop through port 40b.

Alternatively, the coupler can be an evanescent waveguide coupler, or other coupler suitable for application in fiber optic circuits. In an integrated optical circuit, the coupler can be made, for example, from waveguides realized directly on a substrate.

Once the optical feedback signal is in the feedback loop, it is amplified by the optical amplifier 26, and is transmitted back to the coupler 40 via port 40a. A portion of the signal exits from port 40d to sustain the optical output signal 14 beyond the termination of the activation pulse, and another portion exits from port 40*b* and remains in the feedback loop. As explained for the other embodiments, the gain of the amplifier 26 and the feedback time of the loop can be controlled to maintain a self-sustaining amplification, resulting in the production of a continuous optical output signal 14. An optical filter 30 is inserted in the feedback loop to reduce the noise produced in the feedback loop and to remove the deactivation pulse from the loop, if the deactivation pulse wavelength is different from the activation pulse wavelength, as in a preferred embodiment. A Fabry-Perot tunable filter (JDS) was used in a test setup, with a bandwidth between 1.1 and 1.2 nm and with a 2 dB loss at the operating wavelength. The optical amplifier 26 can be an EDFA amplifier, a semiconductor amplifier, or any type of amplifier compatible with an optical fiber circuit. For application in an integrated optical circuit, the amplifier can be external to the integrated circuit, or may be made directly on the circuit by doping the substrate, so as to be integrated in a circuit together with the optical loop, the couplers and possibly one or both the laser sources.

In a test setup an AMPLIPHOS™ OP-980-F erbium doped fiber amplifier manufactured by the Applicant was used, having a typical saturation output power of 13 dBm at l=1550 nm, an optical bandwidth of 1530–1560 nm and an intrinsic noise figure lower than 4.0 dB.

The optical element for suppressing the feedback optical signal can be an optical coupler 52, similar to coupler 40 but which may have a different coupling ratio. In a test setup a coupler with a 70/30 coupling ratio was used. Also, if the wavelength of the deactivation pulse is different from the wavelength of the activation pulse, coupler 52 can be a wavelength selective (WDM) coupler. An optical deactivation pulse 16 is generated by a pattern generator 46 and a laser source 48, and is transmitted to optical amplifier 26 through coupler 52. In a test made by the inventors, the laser source was a Nortel LC 155CA-20 laser diode, with output power of 20 mW and emission wavelength of 1557 nm; the laser was modulated by its driver, controlled by a Hewlett Packard pattern generator with a maximum frequency of 50 MHz. The optical deactivation pulse enters coupler 52 at port 52*c*, and is transmitted to the feedback loop from port 52*b*. The feedback optical signal in the feedback loop enters coupler 52 at port 52*a*, and most of the feedback optical signal continues in the feedback loop through port 52*b*. A small portion of the signal exits through auxiliary exit port 52*d*, where the signal can be monitored.

When the deactivation optical pulse 16 reaches optical amplifier 26, the optical amplifier is saturated and the feedback loop is interrupted. The optical output signal 14 thus terminates.

In a first experiment made by the inventors port 40*b* of coupler 40 was mechanically spliced to port 52*a* of coupler 52, and no extra fiber 54 was added. The total loss of the feedback loop (excluding amplifier 26) was of 8.24 dB.

The pulse duration was set at 140 ns, which was also the feedback loop round-trip time, including transit in the active fiber of amplifier 26. The output signal 14 was detected with a New Focus photodiode (125 MHz bandwidth) and visualized with an oscilloscope (1 GHz bandwidth).

Figure 6:
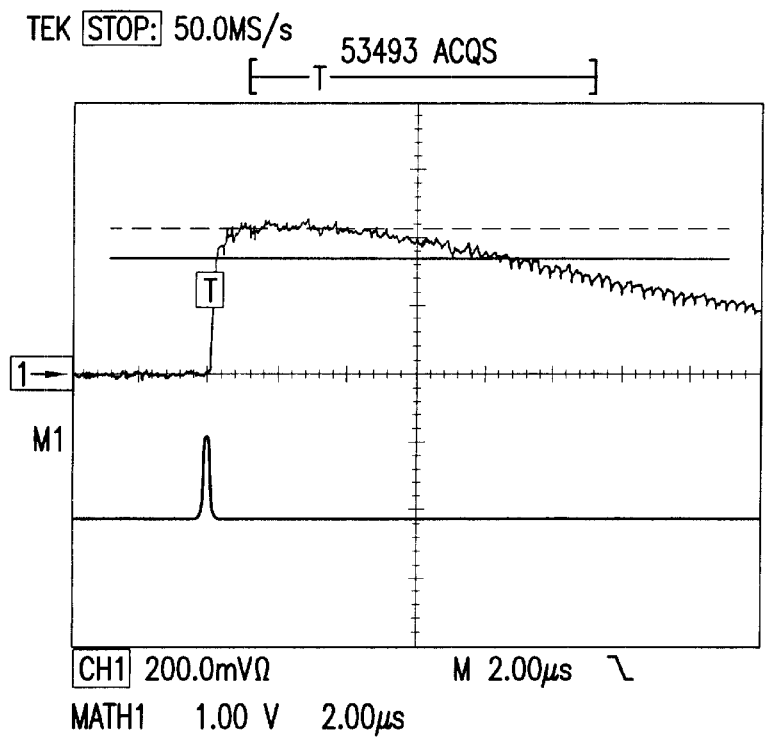
FIG. 6 shows a result of an experiment made with the device of FIG. 5.

FIG. 6 shows the input pulse intensity (lower trace) and the output signal intensity (upper trace) in arbitrary units, plotted against time (2 ms/division). In the experiment the output signal intensity remained within 80% of the maximum value for about 8 ms, corresponding to 58 circulations of the pulse in the loop. The progressive attenuation of the output is caused by a less-than-unity loop gain for the signal circulating in the feedback ring.

In a second experiment made by the inventors, the deactivation function of the optical window generator was tested. The minimum duration of the deactivation pulse with the available source 48 was of 13 ms, with a rise time of 4 ms. To adopt an activation pulse duration of 10.8 ms, comparable to the deactivation pulse duration, a length of 2 km of step index monomode optical fiber 54 was connected between port 40*b* of coupler 40 and port 52*a* of coupler 52, so as to achieve a round trip time equal to the above activation pulse duration. The total loss of the feedback loop (excluding amplifier 26) was in this case of 8.84 dB. By positioning optical fiber 54 upstream coupler 52, delays to the deactivation pulse action were minimized.

Waveform generator 42 driving activation pulse source 44 and pattern generator 46 driving deactivation pulse source 48 were controlled so as to achieve a predetermined delay between activation and deactivation pulses.

Figure 7:
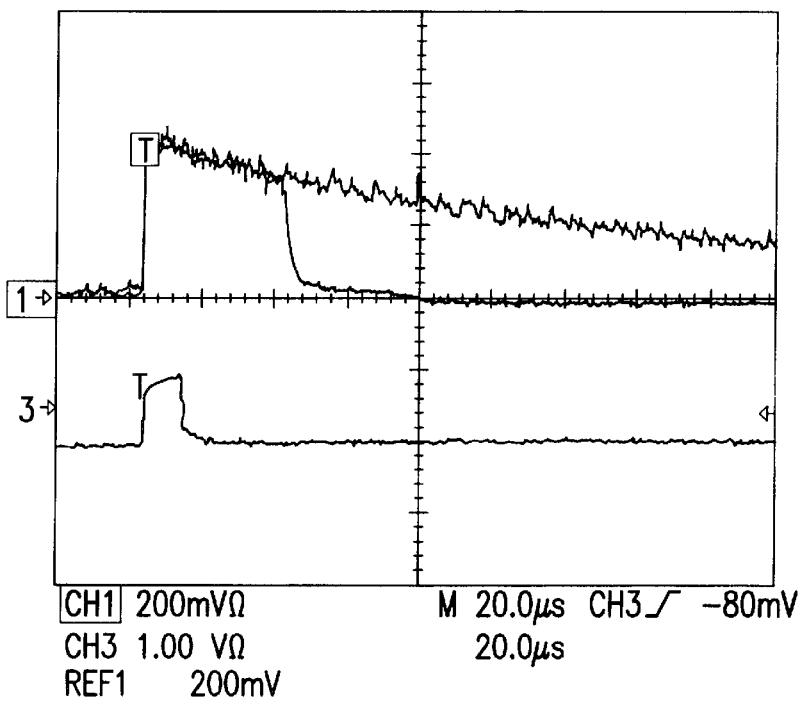
FIG. 7 shows a first measurement in a second experiment made with the device of FIG. 5.
Figure 8:
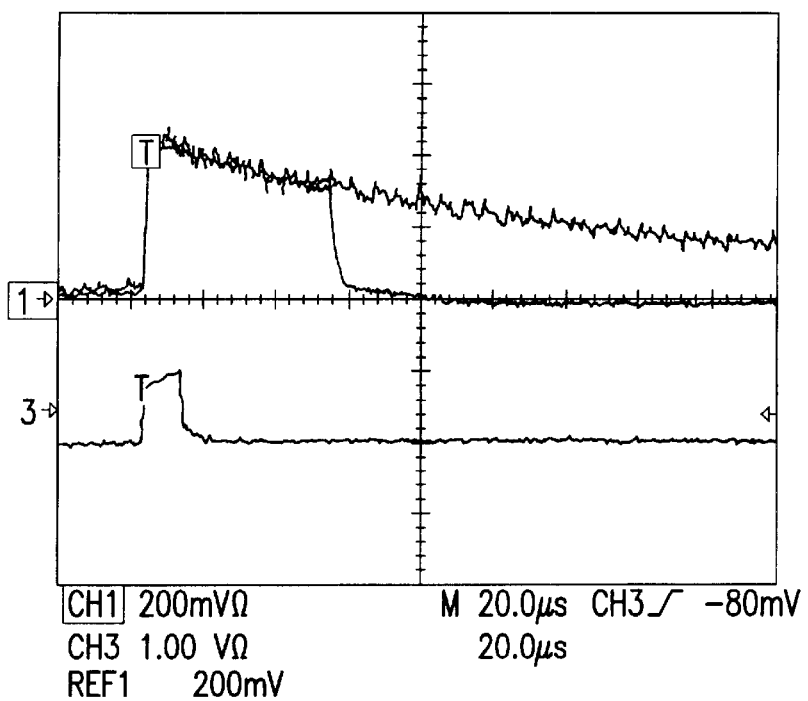
FIG. 8 shows a second measurement in a second experiment made with the device of FIG. 5.

FIG. 7 and FIG. 8 show the activation pulse intensity (lower trace) and the output signal intensity (upper trace) in arbitrary units, plotted against time (20 ms/division), for the two cases of a deactivation pulse starting 38.7 ms (FIG. 7) and 51.7 ms (FIG. 8) after the start of the activation pulse.

The rise time of the generated optical window pulse (i.e., the time required to go from 10% to 90% of the maximum pulse power) is dictated by the rise time of the activation pulse. In the experiment rise times of 1.36 ms and 1.37 ms were measured in the two cases. The activation switching energy was of about 10 nJ, corresponding to the activation pulse energy.

The fall time of the generated optical window pulse (i.e., the time required to go from 90% to 10% of the maximum pulse power) depends on both the saturation time $t_{sat}$ and the rise time of the deactivation pulse. In the experiment fall times of 6.40 ms and 6.81 ms were measured. The switching energy required from source 48 for deactivation was equal to 76 nJ, only about 30% of the deactivation pulse energy actually reaching amplifier 26.

The above given values of rise and fall time are only indicative of what was achievable with the instrumentation available at the time the experiments were made. For example, it is expected that a switching rate of about 8 MHz can be achieved with the optical window signal generator of FIG. 5, as above described, with a deactivation pulse source 48 emitting pulses with duration of about 100 ns and energy in a range of few hundreds of nJ. Values of rise time and fall time much shorter than the above given values are expected by the use of laser sources emitting pulses of adequate duration and power.

Based on the teachings given in the above the skilled in the art can determine the appropriate values of parameters such as the activation and deactivation pulse duration, power and wavelength, the optical feedback loop length, the amplifier characteristics, including gain, decay time, length of the active region, saturation power and pump power, in order to meet his/her specific requirements.

It will be apparent to those skilled in the art that various modifications and variations can be made in the structure and methodology of the present invention, without departing from the spirit or scope of the invention. Thus, it is intended that the present invention cover the modifications and variations of this invention provided they come within the scope of the appended claims and their equivalents.

What is claimed is:

1. An optical window signal generator comprising:
   a first beam splitter having first and second inputs and an output;
   a second beam splitter having an input optically coupled to the output of the first beam splitter, a first output, and a second output optically coupled to the second input of the first beam splitter to provide an optical feedback loop;

an optical amplifier included in the feedback loop;

whereby, an activation optical pulse communicated to the first input of the first beam splitter is split into a leading portion of an output optical signal and a feedback optical signal at the first and second outputs, respectively, of the second beam splitter, the feedback optical signal being amplified by the optical amplifier to sustain the output optical signal beyond termination of the activation optical pulse; and an optical element included in the feedback loop for suppressing the feedback optical signal in response to receipt of a deactivation optical pulse, whereby the sustained output optical signal is terminated.

2. The optical window signal generator of claim 1, further comprising an optical filter included in the feedback loop for removing noise generated in the feedback loop.

3. The optical window signal generator of claim 1, wherein the optical element for suppressing the feedback optical signal is a third beam splitter having a first input and a first output for transmitting the feedback optical signal, and having a second input and a second output optically coupled to the optical amplifier, whereby the deactivation optical pulse communicated to the second input of the third beam splitter is transmitted to the optical amplifier to saturate the optical amplifier, thus terminating the sustained output optical signal.

4. The optical window signal generator of claim 1, wherein the optical element for suppressing the feedback optical signal is an optical interrupter with optical command, whereby the optical deactivation pulse communicated to the optical element causes the optical element to interrupt the feedback loop, thus terminating the sustained output optical signal.

5. The optical window signal generator of claim 4, wherein the optical element for suppressing the feedback optical signal is a Pockel cell.

6. The optical window signal generator of claim 1, wherein the feedback loop has a feedback time equal to a pulse duration of the activation pulse.

7. The optical window signal generator of claim 1, wherein the optical amplifier has a gain which compensates for losses incurred by the feedback optical signal in the feedback loop.

8. The optical window signal generator of claim 1, wherein the optical amplifier is a semiconductor optical amplifier.

9. The optical window signal generator of claim 1, wherein the optical amplifier is an erbium-doped fiber amplifier.

10. The optical window signal generator of claim 1, wherein the feedback loop is formed of optical fibers.

11. The optical window signal generator of claim 1, wherein the optical activation and deactivation pulses are square pulses.

12. A method for generating an optical window signal started by an optical activation pulse and terminated by an optical deactivation pulse, comprising the steps of:

communicating the optical activation pulse to an optical feedback loop, wherein the feedback loop has a feedback time equal to a duration of the optical activation pulse;

splitting the optical activation pulse into a leading portion of an output optical signal and into a feedback optical signal;

amplifying the feedback optical signal to sustain the output optical signal beyond the termination of the optical activation pulse, and to maintain self sustaining amplification;

communicating the optical deactivation pulse to the optical feedback loop;

terminating self sustaining amplification in response to the optical deactivation pulse, thus terminating the sustained output optical signal.

13. The method of claim 12, wherein the self sustaining amplification is terminated by saturating the optical amplifier with the optical deactivation pulse.

14. The method of claim 12, wherein the self sustaining amplification is terminated by suppressing the feedback optical signal with an optical interrupter activated by the optical deactivation pulse.

15. An optical window signal generator comprising:

an optical coupler for inserting an optical activation pulse in a feedback loop, wherein the feedback loop has a feedback time equal to a duration of the optical activation pulse, and for extracting an optical output signal from the feedback loop;

an optical amplifier included in the feedback loop, wherein the optical activation pulse communicated to the optical coupler is split by the optical coupler into a leading portion of the optical output signal and a feedback optical signal, the feedback optical signal being amplified by the optical amplifier and transmitted to the optical coupler to sustain the optical output signal beyond termination of the optical activation pulse; and an optical element included in the feedback loop for suppressing the feedback optical signal in response to receipt of an optical deactivation pulse, so that the sustained optical output signal is terminated.

16. The optical window signal generator of claim 15, wherein the optical coupler is an evanescent wave guide coupler.

17. The optical window signal generator of claim 15, wherein the optical coupler is a fused fiber coupler.

18. The optical window signal generator of claim 15, wherein the optical amplifier is a semiconductor optical amplifier.

19. The optical window signal generator of claim 15, wherein the optical amplifier is a fiber optical amplifier.

20. The optical window signal generator of claim 15, wherein the optical element for suppressing the feedback optical signal is a coupler for communicating an optical deactivation pulse to the optical amplifier, thereby saturating the optical amplifier and terminating the optical output signal.

21. The optical window signal generator of claim 15, wherein the optical element for suppressing the feedback optical signal is an optical interrupter with optical command, whereby the optical deactivation pulse causes the optical element to interrupt the feedback loop and terminate the sustained optical output signal.

22. The optical window signal generator of claim 15, wherein the optical amplifier has a gain which compensates for a loss incurred by the feedback optical signal in the feedback loop.

23. The optical window signal generator of claim 15, wherein the feedback loop is formed of optical waveguides.

24. The optical window signal generator of claim 15, further comprising an optical filter for removing noise generated in the feedback loop.

* * * * *